(12) United States Patent
Yamamoto

(10) Patent No.: US 9,222,765 B2
(45) Date of Patent: Dec. 29, 2015

(54) QUANTITATIVE PHASE MEASUREMENT APPARATUS

(75) Inventor: Kazuki Yamamoto, Kyoto (JP)

(73) Assignee: SEKISUI INTEGRATED RESEARCH INC., Kyoto (JP)

( * ) Notice: Subject to any disclaimer, the term of this patent is extended or adjusted under 35 U.S.C. 154(b) by 114 days.

(21) Appl. No.: 14/119,173

(22) PCT Filed: Dec. 22, 2011

(86) PCT No.: PCT/JP2011/007193
§ 371 (c)(1),
(2), (4) Date: Nov. 20, 2013

(87) PCT Pub. No.: WO2013/093975
PCT Pub. Date: Jun. 27, 2013

(65) Prior Publication Data
US 2014/0162349 A1    Jun. 12, 2014

(51) Int. Cl.
*G01B 9/02* (2006.01)
*G02B 21/14* (2006.01)
*G02B 27/28* (2006.01)

(52) U.S. Cl.
CPC ............ *G01B 9/02041* (2013.01); *G02B 21/14* (2013.01); *G02B 27/283* (2013.01)

(58) Field of Classification Search
CPC .. G01B 9/02041; G01B 21/14; G01B 27/283; G01B 21/0056
USPC .................... 359/370, 371, 386, 484.09, 583; 435/288.7; 356/491, 495
See application file for complete search history.

(56) References Cited

U.S. PATENT DOCUMENTS

| | | | | |
|---|---|---|---|---|
| 3,658,405 | A | * | 4/1972 | Pluta .............................. 359/371 |
| 5,969,855 | A | * | 10/1999 | Ishiwata et al. ............... 359/386 |
| 6,025,956 | A | * | 2/2000 | Nagano et al. ................ 359/386 |
| 6,512,385 | B1 | * | 1/2003 | Pfaff et al. ............... 324/754.23 |
| 6,741,356 | B1 | * | 5/2004 | Ishiwata et al. ............... 356/491 |
| 2006/0192973 | A1 | | 8/2006 | Aiyer et al. |
| 2009/0219607 | A1 | * | 9/2009 | Saggau et al. ................ 359/305 |
| 2009/0290156 | A1 | | 11/2009 | Popescu et al. |
| 2010/0231895 | A1 | | 9/2010 | Mann et al. |
| 2014/0043617 | A1 | * | 2/2014 | Uemura ........................ 356/495 |

FOREIGN PATENT DOCUMENTS

JP      2008-292939 A    12/2008
WO    WO-20071047761 A1    4/2007

OTHER PUBLICATIONS

Kemper et al., "Digital Holographic Microscopy", Optik & Photonik, No. 2, WILEY-VCH Verlag GmbH & Co., KGaA, Weinheim, Jun. 2007.*

(Continued)

*Primary Examiner* — Frank Font
(74) *Attorney, Agent, or Firm* — Cheng Law Group, PLLC

(57) ABSTRACT

Provided is a small-sized quantitative phase measurement apparatus. The quantitative phase measurement apparatus 1 includes a reflective polarization splitting element 17. The reflective polarization splitting element 17 is disposed at a focusing position of the converging light L4, and performs splitting of the converging light L4 into two polarized beams having different polarization directions and reflection of the two polarized beams to form a first polarized beam L5 and a second polarized beam L6 both travelling toward the converging optical system 16.

8 Claims, 6 Drawing Sheets

(56) References Cited

OTHER PUBLICATIONS

International Search Report for the Application No. PCT/JP2011/007193 mailed Apr. 3, 2012.

Written Opinion of the International Searching Authority (PCT/ISA/237) for Application No. PCT/JP2011/007193 mailed Apr. 3, 2012.

The Search and Examination Report for Application No. 2013087184 from the Inteliectual Property Office of Singapore mailed Sep. 1, 2015.

* cited by examiner

QUANTITATIVE PHASE MEASUREMENT APPARATUS

TECHNICAL FIELD

This invention relates to quantitative phase measurement apparatuses.

BACKGROUND ART

Atomic force microscopes and scanning electron microscopes are previously known as apparatuses that can measure spatial features of a microscopic three-dimensional object, such as a cell, with nanometer accuracy. However, with the use of an atomic force microscope or a scanning electron microscope, it is often necessary prior to measurement to subject a cell to a troublesome pretreatment, and the cell will suffer irreparable damage during measurement. Therefore, studies have been conducted on a variety of apparatuses that can measure spatial features of a microscopic three-dimensional object, such as a cell, without damaging the sample.

For example, Patent Literature 1 proposes a quantitative phase microscope that can measure a sample, such as a cell, without damaging it.

FIG. 8 shows a schematic block diagram of a quantitative phase microscope 100 described in Patent Literature 1. As shown in FIG. 8, the quantitative phase microscope 100 includes an objective lens 102, a total reflection mirror 103, a transmissive polarization splitting element 104, a condensing lens 105, a spatial filter 106, a half-wave plate 107, and a complex lens 108, which are arranged in this order between a measurement sample S and an image pickup device 101.

In the quantitative phase microscope 100, light H101 to be measured having passed through the measurement sample S is converted into parallel light H102 by the objective lens 102. The light H102 is reflected toward the transmissive polarization splitting element 104 by the total reflection mirror 103.

The light H102 is split, in the transmissive polarization splitting element 104, into a beam H103a traveling straight ahead and through the element 104 and a beam H103b refracted to the beam H103a. These beams H103a and H103b are linearly polarized beams whose polarization directions are orthogonal to each other.

Next, the linearly polarized beams H103a and H103b are converted into converging beams H104 (H104a and H104b), respectively, by the condensing lens 105 and focused on an aperture 106a and a pinhole 106b, respectively, of the spatial filter 106.

The converging beam H104a passing through the aperture 106a is emitted as an object beam H105 holding the same phase information as the light H101 to be measured.

On the other hand, the converging beam H104b passing through the pinhole 106b is converted into a reference beam H106 devoid of the same phase information as the light H101 to be measured and having only information of a uniform phase different from the phase of the light H101 to be measured. The reference beam H106 is polarized to have the same polarization direction as the object beam H105 by the half-wave plate 107 disposed behind the spatial filter 106.

The object beam H105 and the reference beam H106 are superposed at the complex lens 108 to form interference fringes. The image pickup device 101 takes an image of these interference fringes. The phase information of the light to be measured is quantified from the taken image of interference fringes.

CITATION LIST

Patent Literature

[PTL 1]
JP-A-2008-292939

SUMMARY OF INVENTION

Technical Problem

The quantitative phase microscope 100 can measure the thickness or the like of a sample, such as a cell, without damaging it. However, the quantitative phase microscope 100 presents the problem of difficulty in size reduction.

The present invention has a principal object of providing a small-sized quantitative phase measurement apparatus.

Solution to Problem

A quantitative phase measurement apparatus according to the present invention includes a converging optical system, a reflective polarization splitting element, a spatial filter, an interference fringe imaging optical system, an operation part, and a beam splitter. The converging optical system converts light to be measured produced by applying light to a measurement sample and containing phase information on the measurement sample into converging light. The reflective polarization splitting element is disposed at a focusing position of the converging light. The reflective polarization splitting element splits the converging light into two polarized beams having different polarization directions and reflects the two polarized beams to form a first polarized beam serving as a first-order diffracted beam toward the converging optical system and a second polarized beam serving as a zero-order diffracted beam toward the converging optical system. The spatial filter is disposed at a focusing position of the first and second polarized beams focused by the converging optical system. The spatial filter produces from one of the first and second polarized beams a reference beam devoid of a phase delay and a scatter component both derived from the measurement sample and produces from the other of the first and second polarized beams an object beam containing the phase delay and the scatter component both derived from the measurement sample. The interference fringe image formation optical system forms an image of interference fringes by forming a real image of the object beam and simultaneously projecting the reference beam on the same plane as the real image of the object beam. The operation part calculates an in-plane phase distribution of the measurement sample from the image of interference fringes. The beam splitter is disposed between the converging optical system and the spatial filter. The beam splitter performs reflection of at least a portion of the light to be measured toward the converging optical system and transmission of at least respective portions of the first and second polarized beams toward the spatial filter or performs transmission of at least a portion of the light to be measured toward the converging optical system and reflection of at least respective portions of the first and second polarized beams toward the spatial filter.

The spatial filter may have an aperture and a pinhole. In this case, the aperture is preferably configured to let in the second polarized beam and block out the first-order diffracted beam and high-order diffracted beams to produce the object beam containing the phase information on the measurement sample. The pinhole is preferably configured to let in the first polarized beam and block out the scatter component derived from the measurement sample and contained in the first polarized beam to produce the reference beam devoid of the phase information on the measurement sample.

The reflective polarization splitting element suitably used is a reflective plane diffraction grating, but a similar optical element having the effect of splitting light into a plurality of beams of different optical axes may be used.

The beam splitter may be composed of a half mirror or a polarization splitting element.

Advantageous Effects of Invention

The present invention can provide a small-sized quantitative phase measurement apparatus.

DESCRIPTION OF EMBODIMENTS

Figure 1:
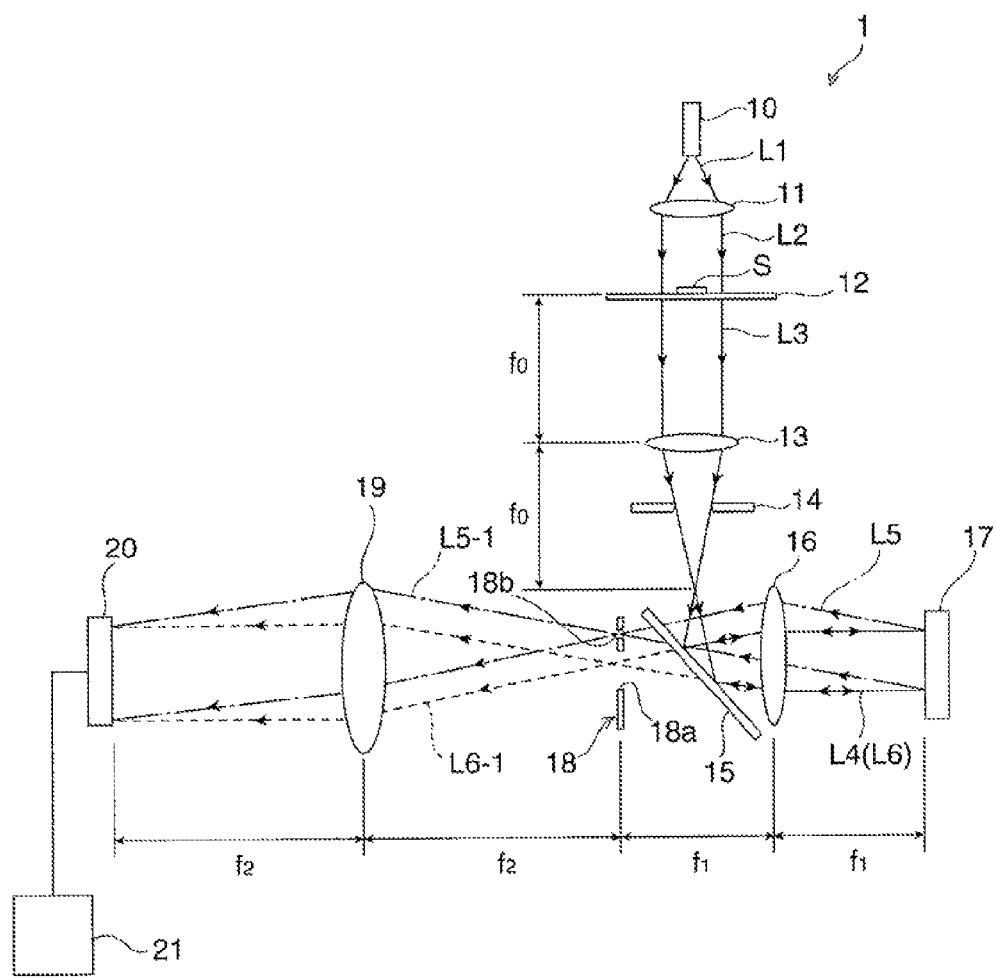
FIG. 1 is a schematic block diagram of a quantitative phase measurement apparatus of a first embodiment.

Hereinafter, a description will be given of exemplified preferred embodiments of the present invention. However, the following embodiments are simply illustrative. The present invention is not limited at all to the following embodiments.

Throughout the drawings to which the embodiments and the like refer, elements having substantially the same functions will be referred to by the same reference signs. The drawings to which the embodiments and the like refer are schematically illustrated and, therefore, the dimensional ratios and the like of objects illustrated in the drawings may be different from those of the actual objects. Different drawings may have different dimensional ratios and the like of the objects. Dimensional ratios and the like of specific objects should be determined in consideration of the following descriptions.

First Embodiment

FIG. 1 is a schematic block diagram of a quantitative phase measurement apparatus 1 of a first embodiment. The quantitative phase measurement apparatus 1 is an apparatus that can measure the thickness or other spatial features of a light-transmissive microscopic measurement sample, such as a cell, in a noncontact and optical manner. The quantitative phase measurement apparatus 1 can perform real-time analysis of, for example, biological cell samples in a living condition without the need for pretreatment. Therefore, the quantitative phase measurement apparatus 1 is effectively used in fields of, for example, drug discovery, healthcare, national security, food industry, pollen allergy, prevention of pandemic infection, bioterrorism surveillance, and detection of bacterial contamination.

The quantitative phase measurement apparatus 1 includes a light source 10, a collimator 11, a measurement sample mount 12, an objective lens 13, a stop 14, a beam splitter 15, a converging optical system 16, a reflective polarization splitting element 17, a spatial filter 18, an interference fringe image formation optical system 19, and an image pickup element 20. The collimator 11, the measurement sample mount 12, the objective lens 13, the stop 14, the beam splitter 15, the converging optical system 16, the reflective polarization splitting element 17, the spatial filter 18, and the interference fringe formation optical system 19 are arranged on an optical path between the light source 10 and the image pickup element 20 and in this order from the light source 10 toward the image pickup element 20. In the following description, the relative positions of elements and the like are the relative positions on the optical path from the light source 10 to the image pickup element 20. In the optical path from the light source 10 to the image pickup element 20, the side thereof closer to the light source 10 is referred to as the "upstream" side and the side thereof closer to the image pickup element 20 is referred to as the "downstream" side.

The light source 10 emits light for use in quantitative phase measurement to the measurement sample S placed on the measurement sample mount 12. The light source 10 may be one emitting only specific polarized light or one emitting unpolarized light.

The collimator 11 is disposed between the light source 10 and the measurement sample S. The collimator 11 converts diverging light L1 emitted from the light source 10 into parallel light L2. If the light source 10 emits parallel light, the collimator 11 is not necessarily provided.

An unshown aperture is formed in the measurement sample mount 12. The measurement sample S is placed on at least a portion of the aperture. Normally, the measurement sample S is placed so that the entire aperture is covered with the measurement sample S. Therefore, the light L1 to be measured having passed through the measurement sample S travels downstream through the measurement sample mount 12.

The light L3 to be measured contains phase information on the measurement sample S. In other words, the light L3 to be measured is light changed in phase as a result of the parallel light L2 having passed through the measurement sample S. More specifically, the light L3 to be measured is light changed in phase from the parallel light L2 to a degree corresponding to the refractive index and thickness of the measurement sample S.

Downstream of the measurement sample mount 12, the objective lens 13 having a focal distance of $f_0$, the stop 14, and the beam splitter 15 are arranged. Downstream of the beam splitter 15, the converging optical system 16 and the reflective polarization splitting element 17 are arranged. The measurement sample mount 12, the objective lens 13, the stop 14, and the beam splitter 15 are arranged in line. The beam splitter 15, the converging optical system 16, and the reflective polarization splitting element 17 are arranged in line. The optical path from the measurement sample mount 12 through the objective lens 13 and the stop 14 to the beam splitter 15 is inclined to the optical path from the beam splitter 15 through the converging optical system 16 to the reflective polarization splitting element 17. More specifically, the optical path from the measurement sample mount 12 through the objective lens 13 and the stop 14 to the beam splitter 15 is orthogonal to the optical path from the beam splitter 15 through the converging optical system 16 to the reflective polarization splitting element 17.

At least a portion of the light L3 to be measured having passed through the objective lens 13 and the stop 14 is reflected by the beam splitter 15 and guided toward the converging optical system 16 and the reflective polarization splitting element 17. In this manner, the traveling direction of at least a portion of the light L3 to be measured is changed by the beam splitter 15. More specifically, the traveling direction of at least a portion of the light L3 to be measured is deflected 90 degree by the beam splitter 15. Therefore, the beam splitter 15 constitutes a dioptric system. The beam splitter 15 may be one reflecting substantially the total light L3 to be measured.

The light L3 to be measured reflected by the beam splitter 15 is converted into converging light L4 by the converging optical system 16. In this embodiment, the converging optical system 16 is composed of a convex lens having a focal distance of $f_1$.

The reflective polarization splitting element 17 is disposed at a focusing position of the converging light L4. In other words, the reflective polarization splitting element 17 is disposed at the focal distance $f_1$ of the convex lens from the principal plane of the convex lens constituting the converging optical system 16.

The reflective polarization splitting element 17 splits the converging light L4 into two polarized beams having different polarization directions and reflects the two polarized beams to form a first polarized beam L5 serving as a first-order diffracted beam toward the converging optical system 16 and a second polarized beam L6 serving as a zero-order diffracted beam toward the converging optical system 16. Specifically, the reflective polarization splitting element 17 splits the converging light L4 into a linearly polarized beam constituting the first polarized beam L5 serving as a polarized component and a linearly polarized beam constituting the second polarized beam L6 serving as another polarized component, and reflects these beams in different directions. The first polarized beam L5 and the second polarized beam L6 are preferably 90 degree different in polarization direction. For example, if the converging light L4 contains a P-polarized component and an S-polarized component, the first polarized beam L5 can be a P-polarized reflected beam and the second polarized beam L6 can be an S-polarized reflected beam.

In FIG. 1, the first polarized beam L5 is indicated by the dash-and-dot line and the second polarized beam L6 is indicated by the broken line. The second polarized beam L6 is superposed on the light L3 to be measured and the converging light L4 between the reflective polarization splitting element 17 and the beam splitter 15.

The focusing position can be controlled by moving the reflective polarization splitting element 17 on the optical path or changing the rotational position of the reflective polarization splitting element 17.

The reflective polarization splitting element 17 can be composed of a reflective plane diffraction grating, for example. A preferred example of the reflective plane diffraction grating used is a blazed holographic plane diffraction grating. The reason for this is that it can provide high diffraction efficiency and is less likely to produce stray light. However, the reflective polarization splitting element 17 is not required to have a high degree of polarization split. Therefore, it is not limited to the reflective plane diffraction grating and can be replaced by any similar optical element having the effect of splitting light into a plurality of beams of different optical axes.

A transmissive spatial optical phase modulator may be additionally disposed between the reflective polarization splitting element 17 and the converging optical system 16. The transmissive spatial optical phase modulator can variously and dynamically modulate the amplitude and phase of spatially distributed light flux.

The first polarized beam L5 and second polarized beam L6 produced in the reflective polarization splitting element 7 individually enter the converging optical system 16 again and are converted into their respective converging beams.

The spatial filter 18 is disposed at the focusing position of the first and second polarized beams L5 and L6 having been converted into converging beams in the converging optical system 16. Specifically, the spatial filter 18 is disposed at the focal distance f1 of the convex lens from the principal plane of the convex lens constituting the converging optical system 16, opposite to the reflective polarization splitting element 17. The beam splitter 15 is located between the spatial filter 18 and the converging optical system 16. At least respective portions of the first and second polarized beams L5 and L6 pass through the beam splitter 15 and enter the spatial filter 18.

No particular limitation is placed on the type of beam splitter 15 so long as it reflects at least a portion of the light L3 to be measured and transmits at least respective portions of the first and second polarized beams L5 and L6. The beam splitter 15 can be composed of a half mirror or a polarization splitting element, for example. An example of the half mirror that can be used is a mirror deposited with metal. When a polarization splitting element is used as the beam splitter 15, an additional quarter wave plate may be provided between the beam splitter 15 and the converging optical system 16.

The spatial filter 18 produces, from one and the other of the first and second polarized beams L5 and L6, an object beam containing a phase delay and a scatter component derived from the measurement sample and a reference beams devoid of the phase delay and the scatter component derived from the measurement sample, respectively. Specifically, in this embodiment, the spatial filter 18 produces an object beam L6-1 and a reference beam L5-1 from the second polarized beam L6 and the first polarized beam L5, respectively.

Figure 2:
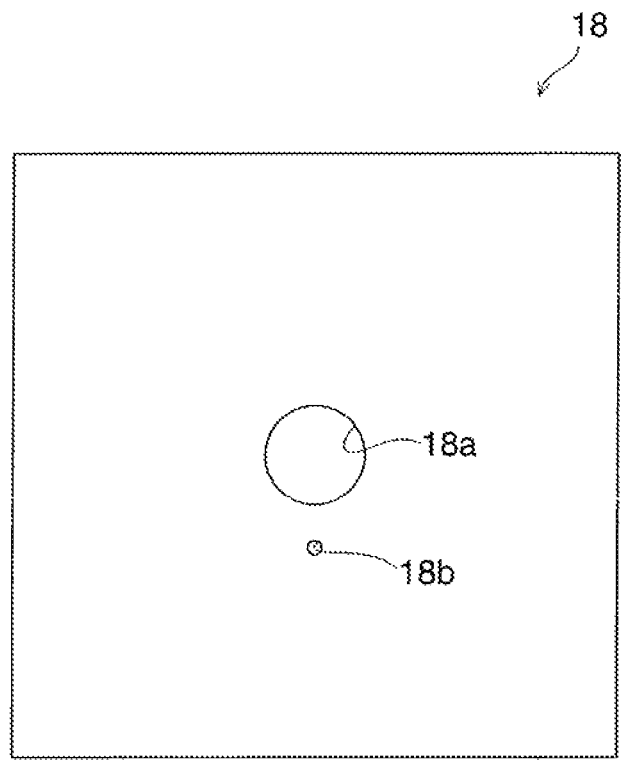
FIG. 2 is a schematic plan view of a spatial filter.

More specifically, in this embodiment, the spatial filter 18 is composed of a sheet member in which as shown in FIG. 2, an aperture 18a and a pinhole 18b are formed. The aperture 18a is positioned at a focal position of the second polarized beam L6. The aperture 18a is formed in a shape size that can block out a first-order or high-order diffracted beam but transmit the polarized beam L6 which is a zero-order diffracted beam. The second polarized beam L6 passes through the aperture 18a with phase information on the measurement sample S contained therein. Therefore, the beam having passed through the aperture 18a constitutes the object beam L6-1 containing phase information on the measurement sample S.

On the other hand, the pinhole 18b is positioned at a focal position of the first polarized beam L5 which is a first-order diffracted beam. The pinhole 18b is formed in a shape size that can block out a component of the first polarized beam L5 derived from scatter light due to the measurement sample S. Therefore, when having passed through the pinhole 18b, the first polarized beam L5 constitutes a reference beam L5-1 devoid of the phase information on the measurement sample S and having only information of a different uniform phase.

Here, the diameter $d_2$ of the aperture 18a is obtained from the following Equation (1):

$$d_2 = 2D \qquad (1)$$

where D represents the aperture diameter of the stop 14. Ahead of or behind the aperture 18a, an additional optical element may be placed, such as a neutral density filter, a stop, or a half-wave plate.

The diameter $d_3$ of the pinhole 18b should preferably satisfy the relation shown in the following Equation (2):

$$d_3 = 1.22 (\text{lambda}) f_0 / D \tag{2}$$

where (lambda) represents the wavelength of the light L3 to be measured.

Figure 3:
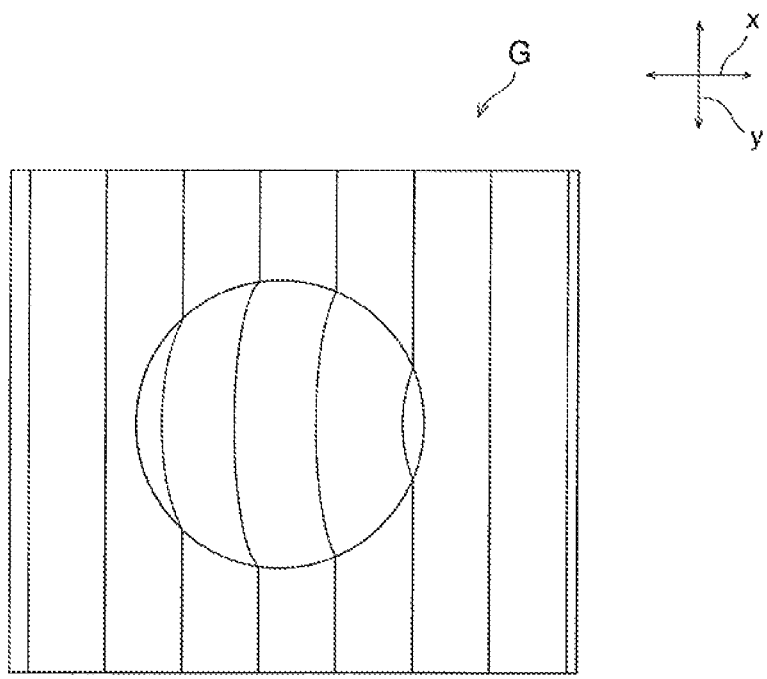
FIG. 3 is a schematic plan view of an image of interference fringes.

The interference fringe image formation optical system 19 is disposed downstream of the spatial filter 18. The interference fringe image formation optical system 19 forms a real image of the object beam L6-1 and simultaneously projects the reference beam L5-1 on the same plane as the real image. Thus, owing to a phase difference between the object beam and the reference beam, an image G of interference fringes as shown in FIG. 3 is formed on the imaging surface of the image pickup element 20.

An operation part 21 connected to the image pickup element 20 calculates the in-plane phase distribution of the measurement sample S from the image G of interference fringes and calculates, based on the in-plane phase distribution, the thickness or the like of the measurement sample S.

Specifically, if the thickness of the measurement sample S is represented by t, the refractive index of the measurement sample S at the wavelength of the light L3 to be measured ((lambda), i.e., the wavelength of light emitted from the light source 10) is represented by $n_c$, and the refractive index of the medium at the wavelength ((lambda)) of the light L3 to be measured is represented by $n_0$, the phase difference (delta)(phi) is represented by the following Equation (3):

$$(\text{delta})(\text{phi}) = (2(\text{pi})/(\text{lambda}))(n_c - n_0) t \tag{3}$$

A distortion due to this phase difference (delta) (phi) is formed in the image G of interference fringes.

The phase difference of the measurement sample S is calculated from the image G of interference fringes in the following manner. The period $d_0$ of the interference fringes in the image G of interference fringes when no measurement sample S exists (hereinafter, referred to as the "carrier period of the interference fringes") is obtained from the following Equation (4):

$$d_0 = (\text{lambda}) f_2 / d_1 \tag{4}$$

where
(lambda) represents the wavelength of light emitted from the light source 10,
$f_2$ represents the focal distance of the convex lens constituting the interference fringe image formation optical system, and
$d_1$ represents the center distance between the aperture 18a and the pinhole 18b.

The pixel pitch of the image pickup element 20 is preferably one third or less of the carrier period $d_0$ of the interference fringes. Furthermore, in order to measure changes in thickness of the measurement sample S with submicron accuracy using a solid-state laser diode ((lambda)=638 nm) as the light source 10, the bit depth of the image pickup element 20 is preferably 10 bits or more.

The luminance value g(x,y) at a position (x,y) of the image G of interference fringes is represented by the following Equation (5):

$$g(x,y) = a(x,y) + b(x,y) \cos [2(\text{pi}) p_0 x + (\text{phi})(x,y)]. \tag{5}$$

In Equation (5),
a(x,y) represents the background component due to the spatial light intensity distribution produced by variations in light intensity of the light source and unevenness of the optical systems,
b(x,y) represents the intensity factor due to the spatial light intensity distribution produced by variations in light intensity of the light source and unevenness of the optical systems, and
$\cos [2(\text{pi}) p_0 x + (\text{phi})(x,y)]$ represents idealized interference fringes,
where
$p_0$ represents the spatial frequency of the interference fringes, i.e., the reciprocal of the carrier period $d_0$ of the interference fringes, and
(phi)(x,y) represents the phase difference corresponding to the thickness of the phase object.

The extraction of the phase delay can be made based on the following Equation (6):

$$g(x,y) = a(x,y) + c(x,y) \exp[2(\text{pi}) i p_0 x + (\text{phi})(x,y)] + c^*(x,y) \exp[-2(\text{pi}) i p_0 x + (\text{phi})(x,y)] \tag{6}$$

Figure 5:
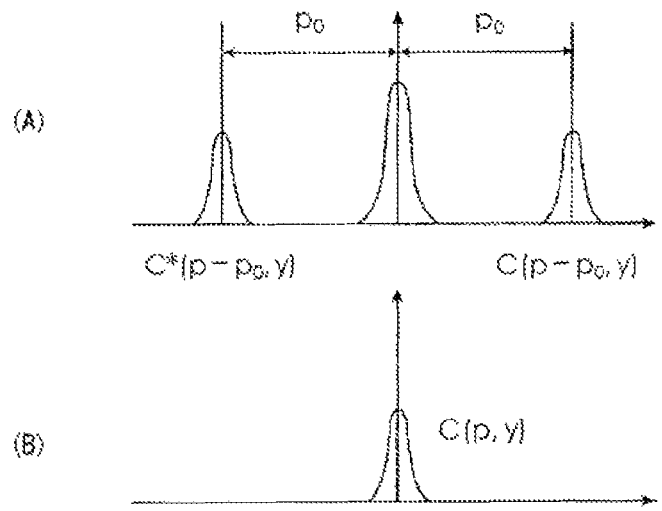
FIGS. 5A and 5B are schematic diagrams for illustrating processing of Fourier spectra of interference fringes.

Now, $c(x,y) = (\frac{1}{2}) b(x,y) \exp[i(\text{phi})(x,y)]$, and $c^*(x,y)$ means the conjugate complex of c(x,y).
So, application of a Fourier transformation to Equation (6) leads to $$G(p,y) = A(p,y) + C(p - p_0, y) + C^*(p + p_0, y),$$

so that Fourier spectra as shown in FIG. 5A can be obtained.

Next, $C(p-p_0,y)$, which is a spectral component, is moved to the origin as shown as C(p,y) in FIG. 5B, and an inverse Fourier transformation is applied, so that c(x,y) can be obtained. In addition, this operation enables the unnecessary component a(x,y) to be eliminated.

Next, the real part (Re) and imaginary part (Im) of c(x,y) is represented by:

$$Re[c(x,y)] = (\frac{1}{2}) b(x,y) \cos [(\text{phi})(x,y)]; \text{ and}$$

$$Im[c(x,y)] = (\frac{1}{2}) b(x,y) \sin [(\text{phi})(x,y)], \text{ respectively}.$$

Using these equations, the phase delay (phi) (x,y) at each point can be derived from $$(\text{phi})(x,y) = \tan^{-1}(Im[c(x,y)] / Re[c(x,y)]).$$

Here, the division of Im[c(x,y)]/Re[c(x,y)] enables the unnecessary component b(x,y) to be eliminated. The spatial frequency of the interference fringes is desirably ⅛ cycles per pixel.

The range of (phi) (x,y) is formed of values from −(pi) to +(pi). The phase difference (delta) (phi) (x,y) due to an effect of the thickness of the target sample is determined by obtaining the phase delay $(\text{phi})_0$ in a region of the image in which the target sample does not exist by estimation from the frequency distribution of (phi) (x,y) and subtracting $(\text{phi})_0$ from the phase delay (phi) (x,y) at each point. Then, the thickness of the target sample can be determined from the relation between the phase difference (delta) (phi) (x,y) and Equation (3). However, if the thickness of the target sample is so large that the phase difference is above 2(pi), (delta) (phi) (x,y) will fall within the range of 0 to 2(pi), so that the calculation results on thickness will be discontinuous in the plane. Therefore, in this case, the condition of continuity to neighboring points is previously satisfied by compensating for the phase difference (delta) (phi) (x,y) in units of 2(pi). In this manner, also when the phase difference is above 2(pi), the thickness of the target sample can be determined at each point in the plane.

The quantitative phase measurement apparatus 1 of this embodiment can perform non-invasive measurements in which are not used any fluorescent dye, any reflection enhancer impairing cell properties, such as gold particles, and any mechanical probe causing structural damage to cells. Therefore, using the quantitative phase measurement apparatus 1, the thickness or other spatial features of a measurement sample S, such as a cell, can be measured without damage to the measurement sample S. In addition, using the quantitative phase measurement apparatus 1, the behavior of living cells can be visualized. Hence, the quantitative phase measurement apparatus 1 is useful for observation of dynamic morphology alteration of cells.

Furthermore, in the quantitative phase measurement apparatus 1, the object beam L6-1 and the reference beam L5-1 pass through substantially the same environment. Therefore, the object beam and reference beam are subject to substantially the same effects from disturbances, such as vibrations and air currents, and these effects can be cancelled upon formation of the image G of interference fringes. Hence, the quantitative phase measurement apparatus 1 is less likely to cause a reduction in measurement accuracy due to disturbances.

Moreover, by controlling the polarization direction of laser light applied to the measurement sample S, the optical intensity ratio between the object beam L6-1 and the reference beam L5-1 can be controlled. Therefore, an image of interference fringes having a high contrast can be produced.

Figure 4:
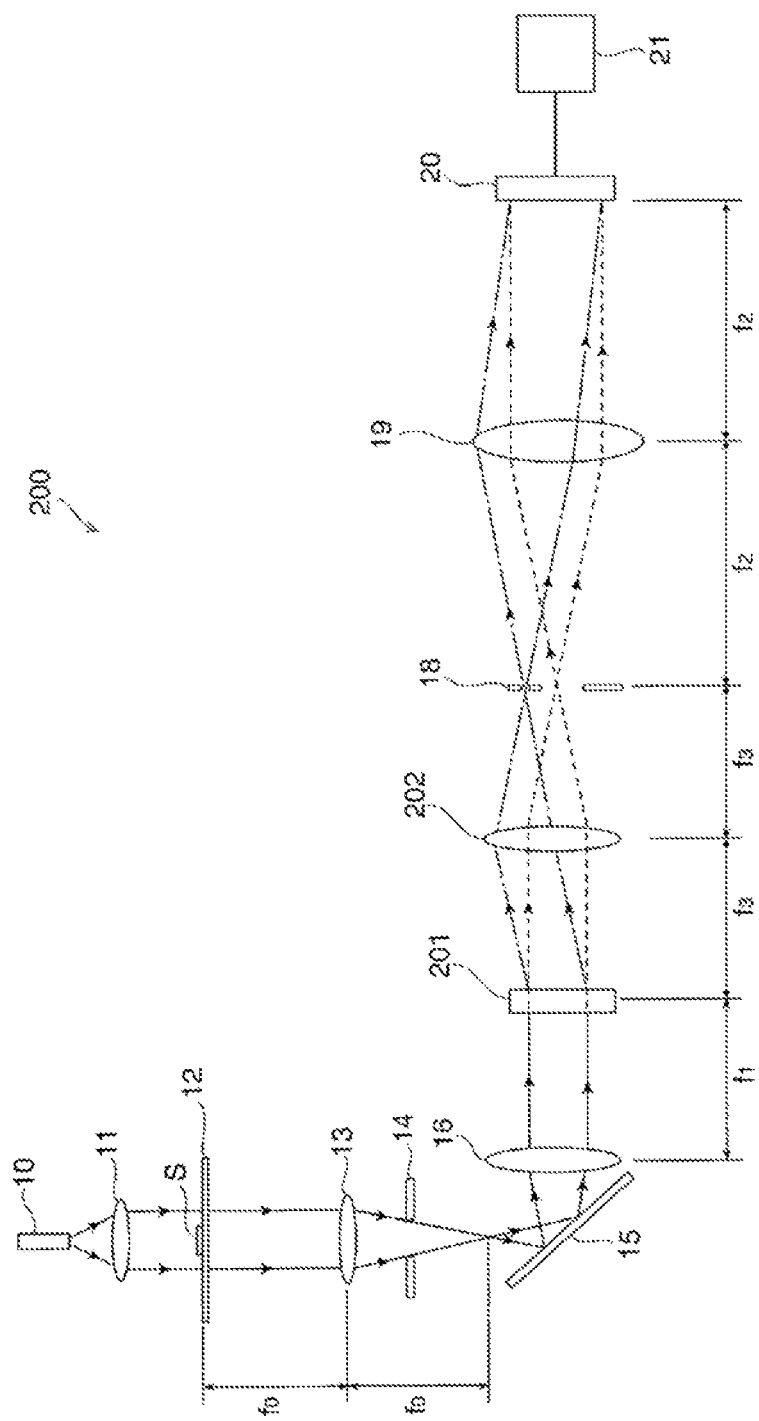
FIG. 4 is a schematic block diagram of a quantitative phase measurement apparatus of a reference example.

FIG. 4 is a schematic block diagram of a quantitative phase measurement apparatus 200 of a reference example. The quantitative phase measurement apparatus 200 is different, from the quantitative phase measurement apparatus 1 in which is used a reflective polarization splitting element 17, in that a transmissive polarization splitting element 201 is used like the quantitative phase measurement microscope 100 described in Patent Literature 1. Furthermore, the quantitative phase measurement apparatus 200 is different, also from the quantitative phase measurement apparatus 100, in that while the quantitative phase measurement apparatus 100 described in Patent Literature 1 does not form a real image of an object beam on the image pickup element, the quantitative phase measurement apparatus 200 forms a real image of an object beam on the image pickup element like the quantitative phase measurement apparatus 1.

Throughout the description of the quantitative phase measurement apparatus 200, elements having substantially the same functions as elements described in relation to the quantitative phase measurement apparatus 1 will be referred to by the same reference signs.

In the quantitative phase measurement apparatus 200 in which the transmissive polarization splitting element 201 is used, a condensing lens 202 has to be additionally provided between the transmissive polarization splitting element 201 and the spatial filter 18. Therefore, if the focal distance of the condensing lens 202 is represented by $f_2$, the distance between the principal plane of the converging optical system 16 and the imaging surface of the image pickup element 20 will be represented by $f_1+2f_3+2f_2$.

In contrast, in the quantitative phase measurement apparatus 1 according to this embodiment, the distance between the principal plane of the converging optical system 16 and the imaging surface of the image pickup element 20 is represented by $2f_1+2f_2$. Here, generally, it can be supposed that $f_1=f_2=f_3$. Therefore, supposing $f_1=f_2=f_3=f$, the distance between the principal plane of the converging optical system 16 and the imaging surface of the image pickup element 20 in the quantitative phase measurement apparatus 200 of the reference example will be $5f$. On the other hand, the distance between the principal plane of the converging optical system 16 and the imaging surface of the image pickup element 20 in the quantitative phase measurement apparatus 1 of this embodiment will be $4f$. In addition, the number of components of the quantitative phase measurement apparatus 1 is smaller than that of the quantitative phase measurement apparatus 200 by the number corresponding to the condensing lens 202. For these reasons, the use of the reflective polarization splitting element 17, as in the quantitative phase measurement apparatus 1, can reduce the optical path length. In addition, the entire structure can be compactized also in view of the relative position of the polarization splitting element to the objective lens. Thus, it can be seen that the quantitative phase measurement apparatus 1 can be reduced in weight and size.

Moreover, with the use of the reflective polarization splitting element 17, the light intensity loss can be reduced as compared with the use of the transmissive polarization splitting element. Therefore, the measurement accuracy of the quantitative phase measurement apparatus 1 can be increased.

In place of light passing through the measurement sample S, light reflected by the measurement sample S may be used.

Each optical system may be composed of a single lens or a plurality of lenses.

Other preferred embodiments of the present invention will be described below. Throughout the description below, elements having functions substantially common to those of elements of the first embodiment will be referred to by the same reference signs and further explanation thereof will be accordingly omitted.

Second Embodiment

Figure 6:
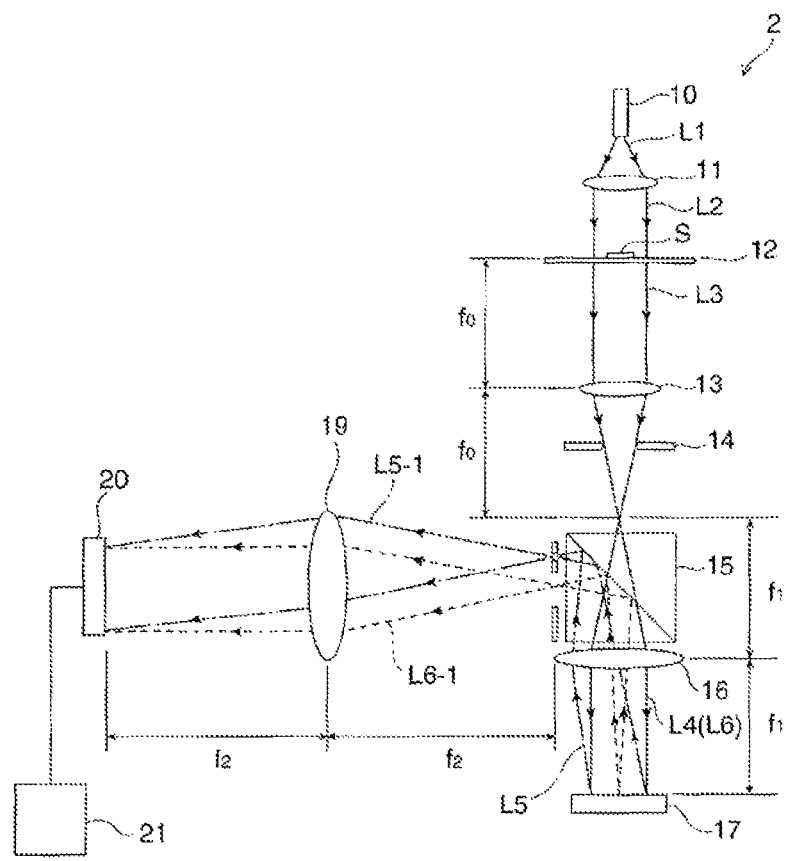
FIG. 6 is a schematic block diagram of a quantitative phase measurement apparatus of a second embodiment.

FIG. 6 is a schematic block diagram of a quantitative phase measurement apparatus 2 of a second embodiment.

Described in the quantitative phase measurement apparatus 1 of the first embodiment is an example in which the beam splitter 15 reflects at least a portion of the light L3 to be measured toward the converging optical system 16 and transmits at least respective portions of the first and second polarized beams L4 and L5 toward the spatial filter 18. Unlike this, in the quantitative phase measurement apparatus 2 of the second embodiment, the beam splitter 15 transmits at least a portion of the light L3 to be measured toward the converging optical system 16 and reflects at least respective portions of the first and second polarized beams L4 and L5 toward the spatial filter 18. Also in such a case, substantially the same effects as described in the first embodiment can be achieved.

Third Embodiment

Figure 7:
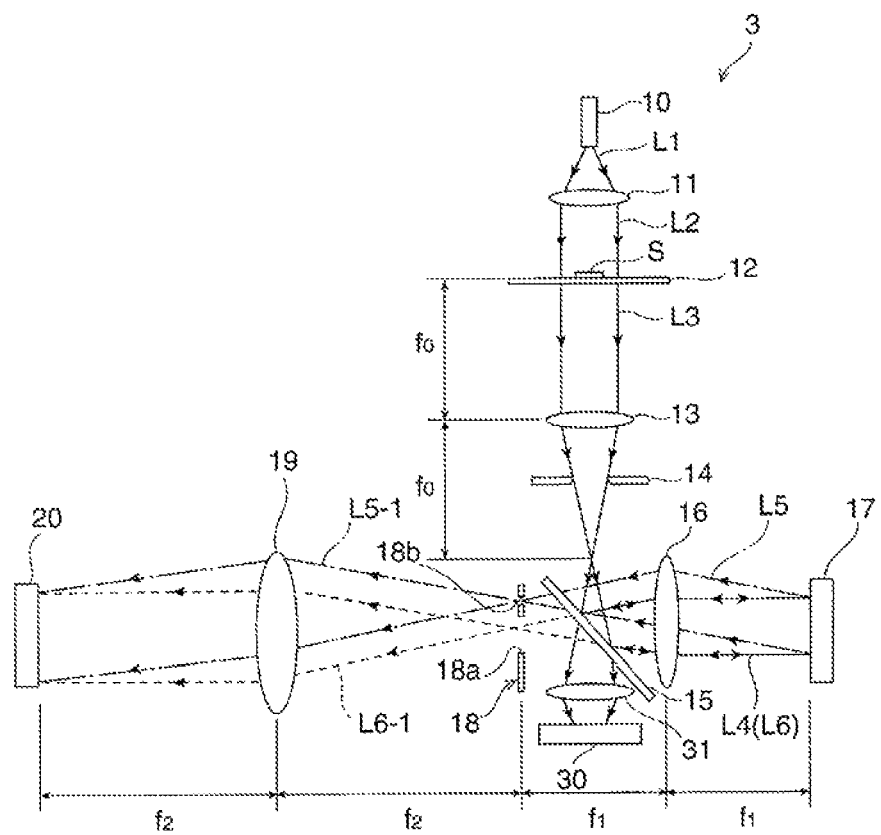
FIG. 7 is a schematic block diagram of a quantitative phase measurement apparatus of a third embodiment.
Figure 8:
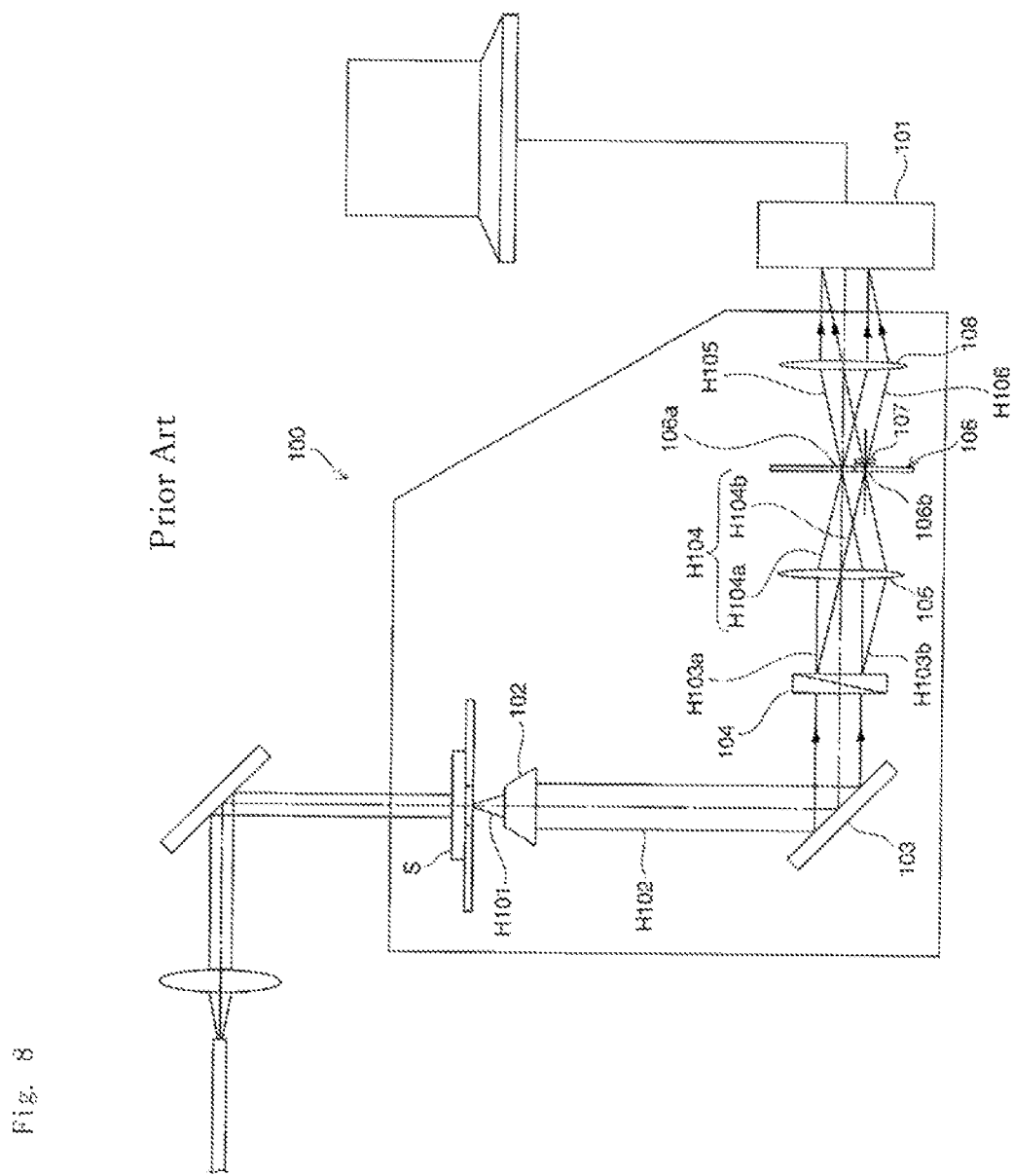
FIG. 8 is a schematic block diagram of a quantitative phase microscope 100 described in Patent Literature 1.

FIG. 7 is a schematic block diagram of a quantitative phase measurement apparatus 3 of a third embodiment.

In the quantitative phase measurement apparatus 3, the beam splitter 15 reflects a portion of the light L3 to be measured toward the reflective polarization splitting element 17 and transmits another portion of the light L3 to be measured. The light having passed through the beam splitter 15 is imaged on the imaging surface of an image pickup element 30 by an imaging optical system 31. Therefore, in the quantitative phase measurement apparatus 3, it is also possible to visually observe the image of the measurement sample S.

(delta)=$\Delta$
(lambda)=$\lambda$
(pi)=$\pi$
(phi)=$\phi$

REFERENCE SIGNS LIST 1-3 . . . Quantitative phase measurement apparatus
10 . . . Light source 11 ... Collimator
12 ... Measurement sample mount
13 ... Objective lens
15 ... Beam splitter
16 ... Converging optical system
17 ... Reflective polarization splitting element
18 ... Spatial filter
18a ... Aperture
18b ... Pinhole
19 ... Interference fringe image formation optical system
20 ... Image pickup element
21 ... Operation part
30 ... Image pickup element
31 ... Imaging optical system

The invention claimed is:

1. A quantitative phase measurement apparatus comprising:
a converging optical system for converting light to be measured produced by applying light to a measurement sample and containing phase information on the measurement sample into converging light;
a reflective polarization splitting element, disposed at a focusing position of the converging light, for splitting the converging beam into two polarized beams having different polarization directions and reflecting the two polarized beams to form a first polarized beam serving as a first-order diffracted beam toward the converging optical system and a second polarized beam serving as a zero-order diffracted beam toward the converging optical system;
a spatial filter, disposed at a focusing position of the first and second polarized beams focused by the converging optical system, for producing from one of the first and second polarized beams a reference beam devoid of a phase delay and a scatter component both derived from the measurement sample and producing from the other of the first and second polarized beams an object beam containing the phase delay and the scatter component both derived from the measurement sample;
an interference fringe image formation optical system for forming an image of interference fringes by forming a real image of the object beam and simultaneously projecting the reference beam on the same plane as the real image of the object beam;
an operation part for calculating an in-plane phase distribution of the measurement sample from the image of interference fringes; and
a beam splitter, disposed between the converging optical system and the spatial filter, for performing reflection of at least a portion of the light to be measured toward the converging optical system and transmission of at least respective portions of the first and second polarized beams toward the spatial filter or performing transmission of at least a portion of the light to be measured toward the converging optical system and reflection of at least respective portions of the first and second polarized beams toward the spatial filter.

2. The quantitative phase measurement apparatus according to claim 1, wherein
the spatial filter has an aperture and a pinhole,
the aperture is configured to let in the second polarized beam and block out the first-order diffracted beam and high-order diffracted beams to produce the object beam containing the phase information on the measurement sample, and
the pinhole is configured to let in the first polarized beam and block out the scatter component derived from the measurement sample and contained in the first polarized beam to produce the reference beam devoid of the phase information on the measurement sample.

3. The quantitative phase measurement apparatus according to claim 1, wherein the reflective polarization splitting element is composed of a reflective plane diffraction grating.

4. The quantitative phase measurement apparatus according to claim 1, wherein the beam splitter is composed of a half mirror or a polarization splitting element.

5. The quantitative phase measurement apparatus according to claim 2, wherein the reflective polarization splitting element is composed of a reflective plane diffraction grating.

6. The quantitative phase measurement apparatus according to claim 2, wherein the beam splitter is composed of a half mirror or a polarization splitting element.

7. The quantitative phase measurement apparatus according to claim 3, wherein the beam splitter is composed of a half mirror or a polarization splitting element.

8. The quantitative phase measurement apparatus according, to claim 5, wherein the beam splitter is composed of a half mirror or a polarization splitting element.

* * * * *